United States Patent
Pan et al.

(10) Patent No.: US 11,031,773 B2
(45) Date of Patent: *Jun. 8, 2021

(54) TRANSFORMER ISOLATION RESPONSE USING DIRECT CURRENT LINK

(71) Applicant: ABB Schweiz AG, Baden (CH)

(72) Inventors: Jiuping Pan, Raleigh, NC (US); Chunming Yuan, Beijing (CN); Xiaobo Yang, Beijing (CN); Ritwik Majumder, Västerås (SE); Bertil Berggren, Västerås (SE); Frans Dijkhuizen, Västerås (SE)

(73) Assignee: ABB Power Grids Switzerland AG, Baden (CH)

( * ) Notice: Subject to any disclaimer, the term of this patent is extended or adjusted under 35 U.S.C. 154(b) by 119 days.

This patent is subject to a terminal disclaimer.

(21) Appl. No.: 16/366,280

(22) Filed: Mar. 27, 2019

(65) Prior Publication Data

US 2020/0313423 A1    Oct. 1, 2020

(51) Int. Cl.
*H02H 7/00* (2006.01)
*H02H 7/26* (2006.01)

(52) U.S. Cl.
CPC ............ *H02H 7/268* (2013.01); *H02H 7/262* (2013.01); *H02H 7/267* (2013.01)

(58) Field of Classification Search
None
See application file for complete search history.

(56) References Cited

U.S. PATENT DOCUMENTS

| 6,398,616 | B1 | 6/2002 | Motosko, III |
| 6,459,998 | B1 | 10/2002 | Hoffman |

(Continued)

FOREIGN PATENT DOCUMENTS

| CA | 2910713 A1 | 5/2016 |
| CA | 2913441 A1 | 5/2016 |

(Continued)

OTHER PUBLICATIONS

A. Shekhar et al., "Reconfigurable DC Links for Restructuring Existing Medium Voltage AC Distribution Grids," Electric Power Components and Systems, dated Jan. 16, 2018, last accessed Oct. 4, 2018, available at https://www.tandfonline.com/doi/pdf/10.1080/15325008.2017.1346005?needAccess=true.

(Continued)

*Primary Examiner* — Stephen W Jackson
(74) *Attorney, Agent, or Firm* — Slater Matsil, LLP

(57) ABSTRACT

Unique systems, methods, techniques and apparatuses of a distribution system are disclosed. One exemplary embodiment is an alternating current (AC) distribution system including a first substation including a first transformer and a protective device; a first distribution network portion coupled to the first transformer; a second substation; a second distribution network portion; a DC interconnection system coupled between the first distribution network portion and the second distribution network portion; and a control system. The control system is structured to detect a fault in the first transformer or the transmission network, isolate the first distribution network from the fault, determine a set point of the DC interconnection system, and operate the DC interconnection system using the set point so as to transfer a portion of the MVAC from the second distribution network portion to the first distribution network portion.

24 Claims, 4 Drawing Sheets

(56) References Cited

U.S. PATENT DOCUMENTS

| | | | |
|---|---|---|---|
| 7,723,863 | B2 | 5/2010 | Johnson, Jr. et al. |
| 9,197,068 | B2 | 11/2015 | Nuqui et al. |
| 9,197,069 | B2 | 11/2015 | Alston et al. |
| 9,698,589 | B1 | 7/2017 | Leyh |
| 9,893,633 | B1 | 2/2018 | Li et al. |
| 10,819,112 | B1 * | 10/2020 | Pan .................. H02J 3/00125 |
| 2002/0012210 | A1 | 1/2002 | Morris et al. |
| 2005/0168891 | A1 | 8/2005 | Nilman-Johansson et al. |
| 2014/0049998 | A1 * | 2/2014 | Casey .................. H02M 7/48 363/97 |
| 2015/0349655 | A1 | 12/2015 | Petersen et al. |
| 2016/0056729 | A1 | 2/2016 | Tenca |
| 2016/0146192 | A1 | 5/2016 | Kurthakoti Chandrashekhara et al. |
| 2016/0181802 | A1 | 6/2016 | Jacobson et al. |
| 2016/0336928 | A1 | 11/2016 | Kuznetsov |
| 2016/0380429 | A1 | 12/2016 | Krstic |
| 2017/0077699 | A1 | 3/2017 | Kondabathini et al. |
| 2017/0077746 | A1 | 3/2017 | Kanakasabai et al. |
| 2017/0110969 | A1 | 4/2017 | Zhou et al. |
| 2017/0141694 | A1 | 5/2017 | Keister et al. |
| 2017/0338651 | A1 | 11/2017 | Fishman et al. |
| 2017/0338748 | A1 | 11/2017 | Liang et al. |
| 2017/0346398 | A1 | 11/2017 | Long et al. |
| 2018/0006570 | A1 | 1/2018 | Keister et al. |
| 2020/0212679 | A1 * | 7/2020 | Majumder ........ H02J 13/00004 |

FOREIGN PATENT DOCUMENTS

| | | | |
|---|---|---|---|
| CN | 201457837 | U | 5/2010 |
| CN | 102545200 | A | 7/2012 |
| CN | 202840667 | U | 3/2013 |
| CN | 104218805 | A | 12/2014 |
| CN | 104320000 | A | 1/2015 |
| CN | 104333033 | A | 2/2015 |
| CN | 104485821 | A | 4/2015 |
| CN | 104539187 | A | 4/2015 |
| CN | 102938564 | B | 5/2015 |
| CN | 204333981 | U | 5/2015 |
| CN | 204391761 | U | 6/2015 |
| CN | 104852583 | A | 8/2015 |
| CN | 105023058 | A | 11/2015 |
| CN | 105634273 | A | 6/2016 |
| CN | 105719196 | A | 6/2016 |
| CN | 105762790 | A | 7/2016 |
| CN | 105790294 | A | 7/2016 |
| CN | 205430053 | U | 8/2016 |
| CN | 205544542 | U | 8/2016 |
| CN | 106099900 | A | 11/2016 |
| CN | 106229984 | A | 12/2016 |
| CN | 106356834 | A | 1/2017 |
| CN | 106357138 | A | 1/2017 |
| CN | 106451439 | A | 2/2017 |
| CN | 106505558 | A | 3/2017 |
| CN | 106602608 | A | 4/2017 |
| CN | 206117151 | U | 4/2017 |
| CN | 104934972 | B | 5/2017 |
| CN | 106655267 | A | 5/2017 |
| CN | 106711994 | A | 5/2017 |
| CN | 106712561 | A | 5/2017 |
| CN | 106786598 | A | 5/2017 |
| CN | 206302343 | U | 7/2017 |
| CN | 107070249 | A | 8/2017 |
| CN | 107086787 | A | 8/2017 |
| CN | 107086806 | A | 8/2017 |
| CN | 107104416 | A | 8/2017 |
| CN | 107257121 | A | 10/2017 |
| CN | 107332443 | A | 11/2017 |
| CN | 107565834 | A | 1/2018 |
| CN | 107592017 | A | 1/2018 |
| CN | 107612012 | A | 1/2018 |
| CN | 107681886 | A | 2/2018 |
| CN | 107706905 | A | 2/2018 |
| CN | 107733244 | A | 2/2018 |
| CN | 107786099 | A | 3/2018 |
| CN | 107800298 | A | 3/2018 |
| CN | 107800299 | A | 3/2018 |
| CN | 107834854 | A | 3/2018 |
| CN | 107863884 | A | 3/2018 |
| CN | 107887924 | A | 4/2018 |
| CN | 107947146 | A | 4/2018 |
| CN | 107968570 | A | 4/2018 |
| CN | 107968572 | A | 4/2018 |
| CN | 207339264 | U | 5/2018 |
| EP | 0333139 | A1 | 9/1989 |
| EP | 2996237 | A1 | 3/2016 |
| EP | 3018794 | A1 | 5/2016 |
| EP | 3062434 | A1 | 8/2016 |
| EP | 3109992 | A1 | 12/2016 |
| IN | 1246/CHE/2013 | A | 9/2013 |
| JP | 2001298850 | A | 10/2001 |
| JP | 2002191105 | A | 7/2002 |
| JP | 2007020373 | A | 1/2007 |
| JP | 2012029501 | A | 2/2012 |
| KR | 20160040378 | A | 4/2016 |
| KR | 20160081067 | A | 7/2016 |
| WO | 2012116748 | A1 | 9/2012 |
| WO | 2015090365 | A1 | 6/2015 |
| WO | 2016054412 | A1 | 4/2016 |
| WO | 2017058253 | A1 | 4/2017 |
| WO | 2018041338 | A1 | 3/2018 |
| WO | 2018072837 | A1 | 4/2018 |
| WO | 2018079905 | A1 | 5/2018 |

OTHER PUBLICATIONS

X.B. Guo et al., "A Coordinated Optimization Method of SNOP and Tie Switch Operation Simultaneously Based on Cost in Active Distribution Network," CIRED Workshop 2016, dated Feb. 23, 2017, 4 pages, IET, New Jersey, USA.

* cited by examiner

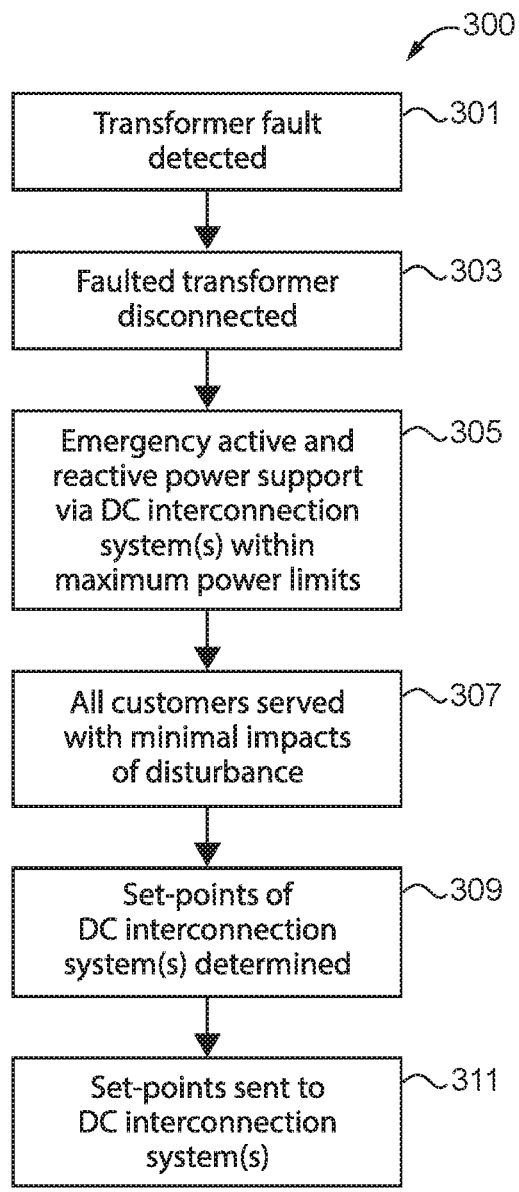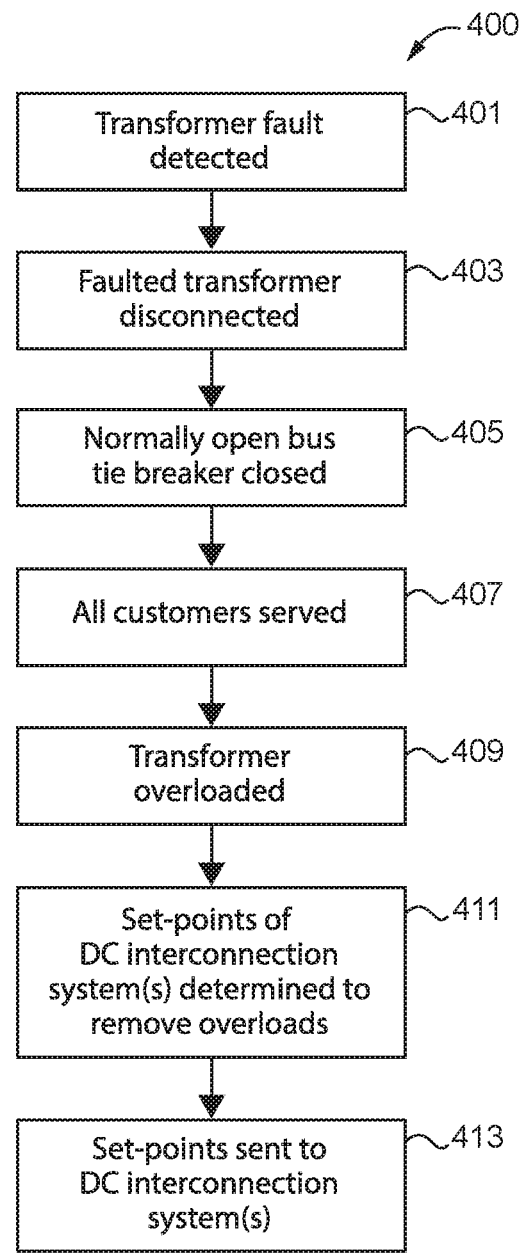
Fig. 3
Fig. 4

TRANSFORMER ISOLATION RESPONSE USING DIRECT CURRENT LINK

BACKGROUND

The present disclosure relates generally to medium voltage alternating current (MVAC) distribution networks. Redundant transformer capacity is necessary in power distribution systems to avoid or limit system downtime following a component failure. Certain distribution substations are designed and operated with one redundant transformer (N-1 reliability) or two redundant transformers (N-2 reliability). To give an example of N-1 reliability, a distribution substation may include two high voltage/medium voltage (HV/MV) transformers with equal capacity ratings, the peak load served by the substation being lower than 60% of the total transformer capacity. If one transformer of the substation must be isolated due to a component fault or line failure, the total loads of the substation can be served by the remaining transformer. In some urban power grids, the distribution substation designs may require N-2 level reliability. For example, if the loads of the substation can be served by two transformers with equal ratings, two additional transformers need to be installed at that substation. When one transformer fails and one transformer is undergoing maintenance, the total loads of the substation can be served by the remaining transformers within their nominal capacity or emergency capacity ratings.

Existing MVAC distribution networks suffer from a number of shortcomings and disadvantages. The demand for increased capacity and increased requirement for network resiliency have created substantial challenges. To increase network capacity, a conventional approach is to build a new substation or expand an existing substation. Building a new substation is costly and may not be feasible in some urban areas. Upgrading existing substations requires significant downtime to replace existing transformers and transmission lines. To increase network resiliency, a conventional approach is to obtain emergency power support from neighboring substations by closing the normally open (NO) tie switches. The service restoration process may take tens of seconds by closing the NO tie-switch if the required capacity is immediately available from a neighboring substation. Otherwise, it may take tens of minutes for the neighboring substation to make the required capacity available by transferring some load to other feeders. In view of these and other shortcomings in the art, there is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY OF THE DISCLOSURE

Exemplary embodiments of the disclosure include unique systems, methods, techniques and apparatuses for fault response in medium voltage alternating current distribution networks. Further embodiments, forms, objects, features, advantages, aspects and benefits of the disclosure shall become apparent from the following description and drawings.

BRIEF DESCRIPTION OF THE DRAWINGS

FIGS. 3-5 illustrate exemplary processes for fault response.

DETAILED DESCRIPTION OF ILLUSTRATIVE EMBODIMENTS

Figure 1:
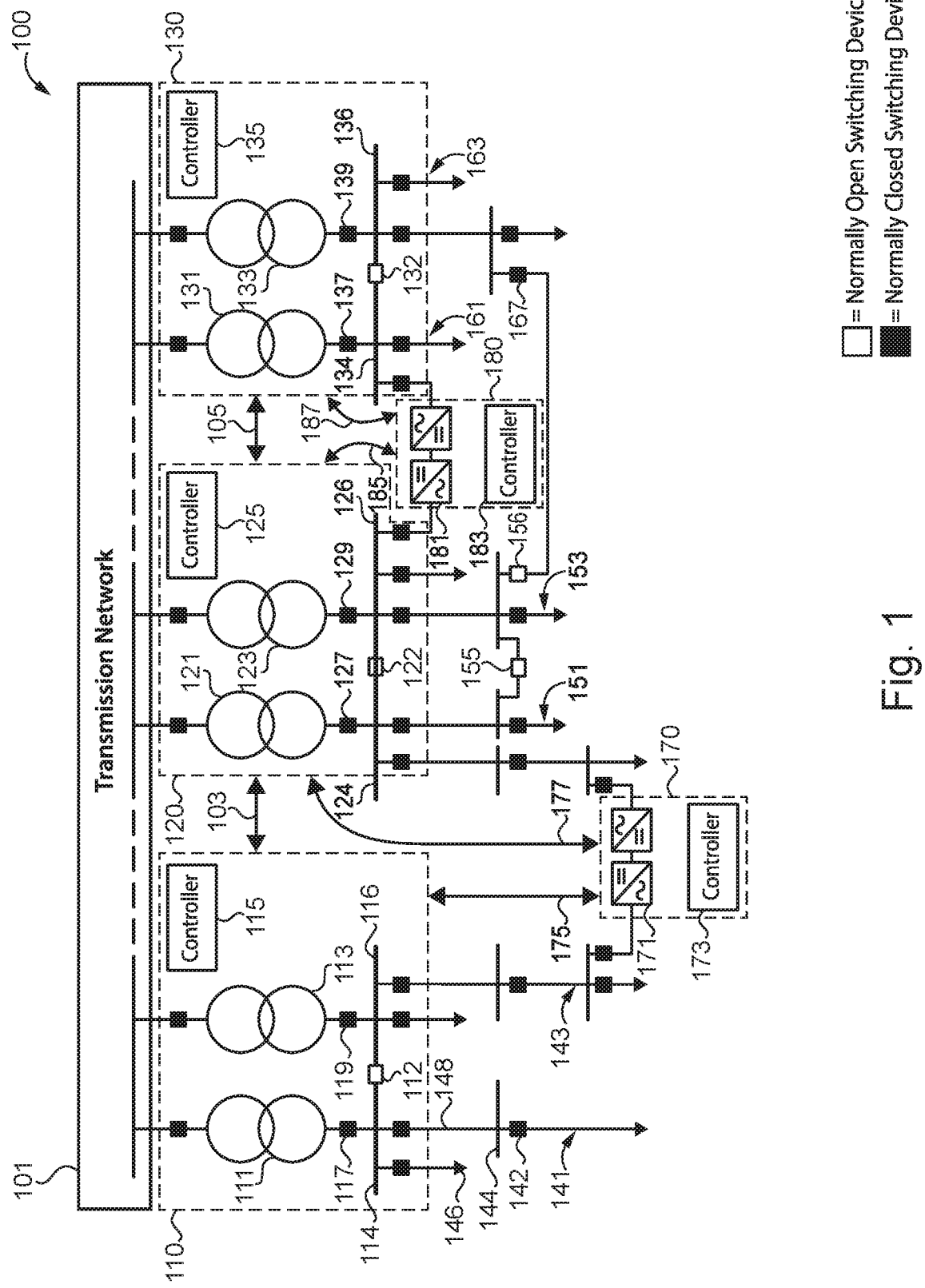
FIGS. 1-2 illustrate exemplary medium voltage alternating current distribution networks.

With reference to FIG. 1, there is illustrated an exemplary medium voltage alternating current (MVAC) distribution network 100 structured to receive high voltage alternating current (HVAC) power from a power transmission network 101 and provide MVAC through feeder lines to medium voltage loads or medium voltage/low voltage (MV/LV) substations coupled to the feeder lines. Network 100 may be an urban distribution network, to name but one example. It shall be appreciated that, for certain applications, medium voltage refers to a voltage greater than or equal to 1 kV and less than 100 kV, high voltage refers to a voltage greater than or equal to 100 kV, and low voltage refers to a voltage less than 1 kV. For certain other applications, medium voltage refers to a voltage greater than or equal to 1 kV and less than or equal to 72 kV, high voltage refers to a voltage greater than 72 kV, and low voltage refers to a voltage less than 1 kV. It shall also be appreciated that the topology of network 100 is illustrated for the purpose of explanation and is not intended as a limitation of the present disclosure. For example, network 100 may include more or fewer substations, feeder lines, protective devices, tie switches, transformers, or DC interconnection systems, to name but a few examples. Although network 100 is illustrated with a single line diagram, network 100 may be structured to transmit single-phase or multiphase power.

Network 100 includes high voltage/medium voltage (HV/MV) substations 110, 120, and 130, each structured to receive HVAC from transmission network 101 and provide MVAC to one or more distribution network portions 141, 143, 151, 153, 161, and 163. Each substation of network 100 includes two transformers, a plurality of protective devices, bus bar portions, a tie switch, and a substation controller.

Substation 110 includes transformers 111 and 113, a plurality of protective devices including devices 117 and 119, substation controller 115, medium voltage bus bars 114 and 116, and tie switch 112. Each transformer 111, 113 is structured to receive HVAC from network 101, step down the voltage of the HVAC to medium voltage, and output MVAC. The plurality of protective devices is structured to interrupt or prevent the flow of current. For example, protective device 117 may be opened to isolate transformer 111 from distribution network portion 141, and protective device 119 may be opened to isolate transformer 113 from distribution network portion 143. Each protective device and tie switch 112 may include a circuit breaker and an intelligent electronic device, to name but one example.

Substation controller 115 is structured to communicate with the plurality of protective devices of substation 110, tie switch 112, substation 120, and DC interconnection system 170. In certain embodiments, substation controller 115 communicates with a central controller, such as a distribution management system (DMS) or supervisory control and data acquisition system (SCADA). Substation controller 115 communicates with substation 120 by way of communication channel 103, and communicates with DC interconnection system 170 by way of communication channel 175. Communication channels 103 and 175 may be wired or wireless, and may use communication protocols such as IEC 61850 standard communication protocols. It shall be appreciated that any or all of the foregoing features of substation 110 may also be present in the other substations disclosed herein.

Substation 120 includes transformers 121 and 123, a plurality of protective devices including devices 127 and 129, medium voltage bus bars 124 and 126, tie switch 122, and substation controller 125. Each transformer 121, 123 is structured to receive HVAC from network 101, step down the voltage of the HVAC to medium voltage, and output MVAC. Substation controller 125 is structured to communicate with the plurality of protective devices of substation 120, tie switches 122 and 155, substations 110 and 130, and DC interconnection systems 170 and 180. Substation controller 125 communicates with substations 110 and 130 by way of communication channels 103 and 105, DC interconnection system 170 by way of communication channel 177, and DC interconnection system 180 by way of communication channel 185. Communication channels 105, 177 or 185 may be wired or wireless, and may use communication protocols such as IEC 61850 standard communication protocols.

Substation 130 includes transformers 131 and 133, a plurality of protective devices including devices 137 and 139, medium voltage bus bars 134 and 136, tie switch 132, and substation controller 135. Each transformer 131, 133 is structured to receive HVAC from network 101, step down the voltage of the HVAC to medium voltage, and output MVAC. Substation controller 135 is structured to communicate with the plurality of protective devices of substation 130, tie switch 132, substation 120, and DC interconnection system 180. Substation controller 135 communicates with substation 120 by way of communication channel 105, and DC interconnection system 180 by way of communication channel 187. Communication channel 187 may be wired or wireless, and may use communication protocols such as IEC 61850 standard communication protocols.

Each transformer of each substation is coupled to a distribution network portion. Transformer 111 is coupled to distribution network portion 141. Transformer 113 is coupled to distribution network portion 143. Transformer 121 is coupled to distribution network portion 151. Transformer 123 is coupled to distribution network portion 153. Transformer 131 is coupled to distribution network portion 161. Transformer 133 is coupled to distribution network portion 163. A transformer may be coupled to more than one distribution network portion by closing a tie switch or through an operating DC interconnection system.

Each distribution network portion includes a plurality of bus bars, protective devices, feeder lines, and loads. For example, distribution network portion 141 includes bus bar 144, protective device 142, feeder line 148, and load 146. Each distribution network portion may be selectively coupled to another distribution network portion by way of a tie switch. Distribution network portion 141 may be coupled to distribution network portion 143 by way of tie switch 112. Distribution network portion 151 may be coupled to distribution network portion 153 by way of one or more of tie switches 122 and 155. Distribution network portion 161 may be coupled to distribution network portion 163 by way of tie switch 132. Distribution network portion 161 may be coupled to distribution network portion 153 by way of tie switches 156 and 167. In certain embodiments, one or more loads may be replaced by a medium voltage/low voltage (MV/LV) substation.

DC interconnection system 170 includes AC/AC power converter 171 and a converter controller 173, also known as a DC interconnection system controller. DC interconnection system 170 may also include one or more transformers and a tie switch, to name but a few examples. AC/AC power converter 171 is structured to transmit MVAC between distribution network portions 143 and 151. AC/AC power converter 171 may be structured as a back-to-back converter where two AC/DC power converters are located proximate to each other and coupled by a DC bus. AC/AC power converter 171 may also be structured as a point-to-point system, where two AC/DC power converters are located remotely from each other and coupled a distribution line. In certain embodiments, AC/AC power converter 171 replaces an existing tie switch. In other embodiments, AC/AC power converter 171 constitutes a new connection between distribution network portion 143 and distribution network portion 151. Converter controller 173 is structured to operate AC/AC converter 171 using either instructions, such as set points, received from a central controller, or instructions based at least in part on local measurements, such as input voltage and current. Controller 173 may be structured to receive measurements from DC link voltage sensors, current sensors, and voltage sensors coupled to bus bars adjacent to system 170, to name but a few examples. It shall be appreciated that any or all of the foregoing features of DC interconnection system 170 may also be present in the other DC interconnection systems disclosed herein.

DC interconnection system 180 includes AC/AC power converter 181 and a converter controller 183. AC/AC power converter 181 is structured to transmit MVAC between distribution network portions 153 and 161.

The control system of network 100, including the substation controllers, converter controllers, and any central controllers, are structured to operate the controllable devices of network 100 in order to increase the power capacity and resiliency of network 100. The controllable devices may include the AC/AC power converters, protection relays, protective devices, capacitor banks, and voltage regulators, to name but a few examples.

The control system of network 100 operates the DC interconnection systems of network 100 so as to enable an increased power capacity of network 100 by sharing transformer capacity with neighboring substations. Power sharing among the substations using the DC interconnection systems provides each substation additional transformer capacity, effectively one or more redundant transformers. After a transformer fault or transmission line fault, this additional transformer capacity may be used for fast service restoration of healthy portions of a distribution network, thereby increasing network resiliency.

By transferring transformer capacity between substations using DC interconnection systems, additional loads can be added to network 100. For example, if a capacity of DC interconnection system 170 is 15% of the capacity of the transformers of substation 110, the load serving capability of substation 110 may be increased from 60% of total transformer capacity to 75% of total transformer capacity.

In normal operating conditions, the DC interconnection systems may actively participate in distribution system economic dispatch or operate in static synchronous compensation mode. In one normal operation mode, the total power supply to the loads of distribution network portions 151 and 153 are shared by transformer 121, transformer 123, and neighboring substations through the controllable power flows of DC interconnection systems 170 and 180. In a second normal operation mode, the loads of distribution network portions 151 and 153 are served by transformers 121 and 123, and the available capacity of DC interconnection systems 170 and 180 are used as spinning reserves.

In a fault response mode, where one transformer of substation 120 experiences a fault and is isolated, the loads of distribution network portions 151 and 153 can be fully served by transferring power using the remaining transformer of substation 120 and the controllable power supply from neighboring substations through DC interconnection systems 170 and 180. It shall be appreciated that any or all of the foregoing features of network 100 may also be present in the other MVAC distribution networks disclosed herein.

Figure 2:
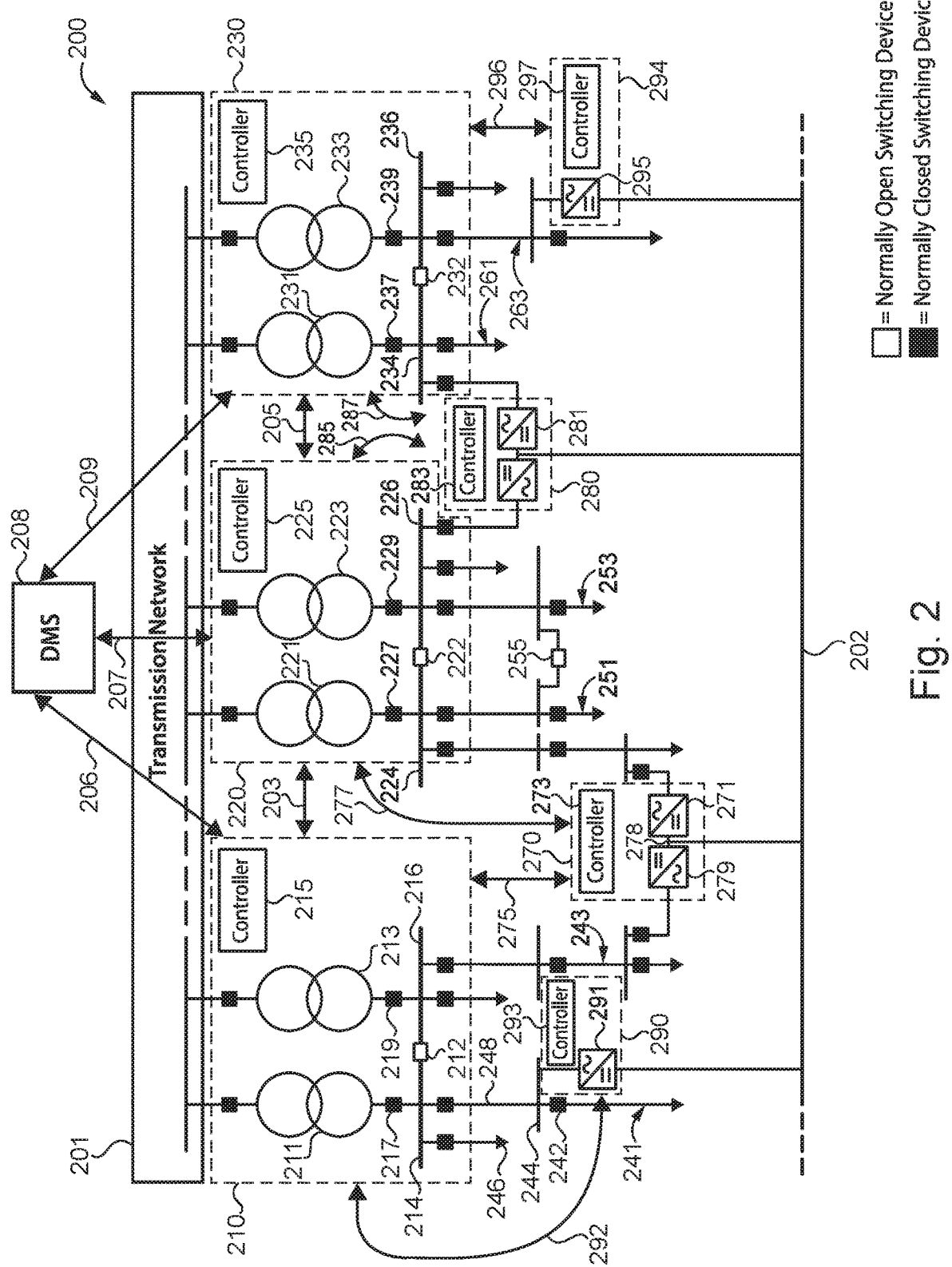

With reference to FIG. 2, there is illustrated an exemplary MVAC distribution network 200 structured to receive HVAC power from a power transmission network 201 and provide MVAC through feeder lines to medium voltage loads or MV/LV substations coupled to the feeder lines. It shall be appreciated that the topology of network 200 is illustrated for the purpose of explanation and is not intended as a limitation of the present disclosure. Although network 200 is illustrated with a single line diagram, network 200 may be structured to transmit single-phase or multiphase power.

Network 200 includes HV/MV substations 210, 220, and 230 structured to receive HVAC from transmission network 201 and provide MVAC to distribution network portions 241, 243, 251, 253, 261, and 263. Each substation includes two transformers, a plurality of protective devices, a tie switch, bus bars, and a substation controller.

Substation 210 includes transformers 211 and 213, a plurality of protective devices including devices 217 and 219, bus bars 214 and 216, tie switch 212, and substation controller 215. Each transformer 211, 213 is structured to receive HVAC from network 201, step down the voltage of the HVAC to medium voltage, and output MVAC. Substation controller 215 is structured to communicate with a plurality of protective devices of substation 210, substation 220, tie switch 212, DC interconnection system 270, DC interconnection system 290, and a DMS controller 208. Substation controller 215 communicates with substation 220 by way of communication channel 203; DC interconnection systems 270 and 290 by way of communication channel 275 and 292, respectively; and DMS controller 208 by way of communication channel 206. Communication channels 203, 206, 275, or 292 may be wired or wireless, and may use communication protocols such as IEC 61850 standard communication protocols. It shall be appreciated that any or all of the foregoing features of substation 210 may also be present in the other substations disclosed herein.

Substation 220 includes transformers 221 and 223, a plurality of protective devices including devices 227 and 229, bus bars 224 and 226, a tie switch 222, and substation controller 225. Each transformer 221, 223 is structured to receive HVAC from network 201, step down the voltage of the HVAC to medium voltage, and output MVAC. Substation controller 225 is structured to communicate with a plurality of protective devices of substation 220, substation 210, substation 230, tie switch 222, tie switch 255, DC interconnection system 270, DC interconnection system 280, and DMS controller 208. Substation controller 225 communicates with substations 210 and 230 by way of communication channels 203 and 205; DC interconnection system 270 by way of communication channel 277; DC interconnection system 280 by way of communication channel 285; and DMS controller 208 by way of communication channel 207. Communication channels 205, 207, 277, or 285 may be wired or wireless, and may use communication protocols such as IEC 61850 standard communication protocols.

Substation 230 includes transformers 231 and 233, a plurality of protective devices including devices 237 and 239, bus bars 234 and 236, tie switch 232, and substation controller 235. Each transformer 231, 233 is structured to receive HVAC from network 201, step down the voltage of the HVAC to medium voltage, and output MVAC. Substation controller 235 is structured to communicate with the plurality of protective devices of substation 230, substation 220, tie switch 232, DC interconnection system 280, and DC interconnection system 294. Substation controller 235 communicates with substation 220 by way of communication channel 205; DC interconnection systems 280 and 294 by way of communication channels 287 and 296, respectively; and DMS controller 208 by way of communication channel 209. Communication channels 287, 209, and 296 may be wired or wireless, and may use communication protocols such as IEC 61850 standard communication protocols.

Each transformer of each substation is coupled to a distribution network portion by one or more normally closed protective devices. Transformer 211 is coupled to distribution network portion 241. Transformer 213 is coupled to distribution network portion 243. Transformer 221 is coupled to distribution network portion 251. Transformer 223 is coupled to distribution network portion 253. Transformer 231 is coupled to distribution network portion 261. Transformer 233 is coupled to distribution network portion 263.

Each distribution network portion includes a plurality of bus bars, protective devices, and loads. For example, distribution network portion 241 includes bus bar 244, protective device 242, feeder line 248, and load 246. Each distribution network portion may be selectively coupled to another distribution network portion by way of a tie switch. Distribution network portion 241 may be coupled to distribution network portion 243 by way of tie switch 212. Distribution network portion 251 may be coupled to distribution network portion 253 by way of one or more of tie switches 222 and 255. Distribution network portion 261 may be coupled to distribution network portion 263 by way of tie switch 232.

Each of the DC interconnection systems of network 200 are coupled by a DC distribution network 202. DC interconnection systems 270 and 280 each include an AC/AC power converter including a DC link between two AC/DC power converters. For example, the AC/AC power converter of DC interconnection system 270 includes AC/DC power converters 271 and 279 coupled by way of DC link 278. DC link 278 may be a bus or a DC distribution line, to name but a few examples. The DC link of each DC interconnection system is coupled to DC distribution network 202. Each AC/DC power converter is structured to receive MVAC, convert the MVAC to medium voltage direct current (MVDC), and output MVDC to the DC link. Each AC/DC power converter is also structured to receive MVDC from the DC link, convert the MVDC to MVAC, and output the MVAC. DC interconnection system 270 also includes a converter controller 273 structured to operate AC/DC power converters 271 and 279. DC interconnection system 280 includes AC/AC power converter 281 and converter controller 283. In certain embodiments, network 200 includes renewable energy sources or energy storage systems coupled to network 202. For example, network 200 may include solar arrays or battery banks coupled to network 202.

DC interconnection systems 290 and 294 each include a single AC/DC power converter and a converter controller structured to operate the AC/DC power converter. DC interconnection system 290 includes AC/DC power converter 291 and converter controller 293. AC/DC power converter 291 is structured to receive MVAC from distribution network portion 241, convert the MVAC to MVDC, and output the MVDC to network 202. AC/DC power converter 291 is also structured to receive MVDC from network 202, convert the MVDC to MVAC, and output the MVAC to distribution network portion 241. Converter controller 293 is structured to operate AC/DC power converter 291. AC/DC power converter 295 of DC interconnection system 294 is structured to receive MVAC from distribution network portion 263, convert the MVAC to MVDC, and output the MVDC to network 202. AC/DC power converter 295 is also structured to receive MVDC from network 202, convert the MVDC to MVAC, and output the MVAC to distribution network portion 263. Converter controller 297 is structured to operate AC/DC power converter 295.

DMS controller 208 is structured to coordinate operation of the DC interconnection systems of network 200, including determining set points for each power converter. During a fault response mode, the converter controller of each DC interconnection system may initially operate independently to provide emergency power support or service restoration to isolated, healthy portions of the distribution network. After service restoration, DMS controller 208 is structured to determine set points for each power converter and transmit the set points to each DC interconnection system for implementation. DMS controller 208 may generate set points using protective device switch statuses and power flow data for feeder lines, transformers, and AC/AC power converters, to name but a few examples. Sets points may be generated by taking into account required power support and headroom availability.

Coordination of power transfer by DMS controller 208 using network 202 increases the reliability of network 200. For example, since each of the three substations of network 200 includes a redundant transformer, network 200 effectively has N-3 reliability. The spare transformer capacity may be used to serve additional load areas while maintaining the required N-1 or N-2 reliability requirements. Where N-1 reliability is required of network 200, load serving capability of the distribution network is increased by two transformers, equivalent to building a fourth substation.

With reference to FIG. 3, there is illustrated an exemplary process 300 for responding to a transformer fault in an MVAC distribution network which includes substations, distribution network portions, and one or more DC interconnection systems. Process 300 is implemented by a network control system which may include a centralized controller, one or more substation controllers, and one or more converter controllers. It shall be further appreciated that a number of variations and modifications to process 300 are contemplated including, for example, the omission of one or more aspects of process 300, the addition of further conditionals and operations, the execution of an operation or conditional by a controller other than the controller identified below, and/or the reorganization or separation of operations and conditionals into separate processes.

Process 300 begins at operation 301 where a substation controller of a first substation detects a transformer fault in a transformer of the first substation. The fault may be a short circuit fault or a high impedance fault, to name but a few examples. In other examples, the transformer fault may be detected by a relay, to name but one example.

Process 300 proceeds to operation 303 where the substation controller operates one or more protective devices of the first substation to isolate the faulted transformer from a healthy distribution network portion, also known as the healthy portion, coupled to the faulted transformer. In certain embodiments, the substation controller may operate a plurality of protective devices effective to operate a plurality of healthy distribution network portions from the fault transformer.

Process 300 proceeds to operation 305 where a converter controller determines set points and operates a DC interconnection system using the emergency set points so as to transfer MVAC power to the healthy portion in response to the isolation and before the healthy portion is deenergized, effective to provide emergency active and/or reactive power support. For example, where the fault is a short circuit fault, causing a voltage drop on a bus bar proximate to the DC interconnection system, the converter controller may provide maximum reactive power to the healthy portion while also providing a rapidly increasing active power in response to measuring the bus bar. For example, active power may be increased over a time period between 60-100 ms, to name but one possible range. Maximum reactive power may be determined by the current rating of the DC interconnection system, to name but one example. In certain embodiments where the DC interconnection system cannot transfer sufficient power to meet the demand of the loads of the healthy portion, the control system may close a tie switch coupled to the healthy portion in addition to, or in place of, operating the DC interconnection system. In certain embodiments, operation 305 is performed by the DC interconnection system controller using measurements generated by local sensors, such as DC link voltage sensors, current sensors measuring current received and output by the DC interconnection system, and voltage sensors measuring the bus bars to which the DC interconnection system is coupled, to name but a few examples. In certain embodiments, a plurality of DC interconnection systems are operated to transfer power during operation 305.

Process 300 proceeds to operation 307 where all customers with loads coupled to the healthy portion continue to receive service with only minor disturbances as a result of the power transferred from the DC interconnection systems. Because the DC interconnection system responds to the fault isolation before the healthy portion is deenergized, the healthy isolated portion does not experience a total power interruption. For example, by using the DC interconnection system, emergency power support may be provided to the healthy portion within milliseconds, instead of within seconds or minutes.

Process 300 proceeds to operation 309 where substation controllers or a centralized controller determine set points for each DC interconnection system. Set points may include active and reactive power set points, which are determined effective to reduce power loss and balance power flow though the DC interconnection system and the transformers providing power to the healthy portion. Finally, process 300 proceeds to operation 311 where the determined set points are sent to the converter controller such that the DC interconnection system is operated using the set points determined by operation 309.

With reference to FIG. 4, there is illustrated an exemplary process 400 for responding to a transformer fault in an MVAC distribution network which includes substations, distribution network portions, and one or more DC interconnection systems. Process 400 is implemented by a network control system which may include a centralized controller, one or more substation controllers, and one or more converter controllers. It shall be further appreciated that a number of variations and modifications to process 400 are contemplated including, for example, the omission of one or more aspects of process 400, the addition of further conditionals and operations, the execution of an operation or conditional by a controller other than the controller identified below, and/or the reorganization or separation of operations and conditionals into separate processes.

Process 400 begins at operation 401 where a substation controller of a first substation detects a transformer fault in a transformer of the first substation. The fault may be a short circuit fault or a high impedance fault, to name but a few examples. In other examples, the transformer fault may be detected by a relay, to name but one example.

Process 400 proceeds to operation 403 where the substation controller operates one or more protective devices of the first substation to isolate the faulted transformer from a healthy distribution network portion, also known as the healthy portion, coupled to the faulted transformer. In certain embodiments, the substation controller may operate a plurality of protective devices effective to operate a plurality of healthy distribution network portions from the fault transformer.

Process 400 proceeds to operation 405 where the substation controller closes a normally open tie switch effective to couple the healthy portion to a power source by way of a second transformer of the first substation or a transformer of a neighboring substation.

Process 400 proceeds to operation 407 where all customers with loads coupled to the healthy portion continue to receive service as a result of the closed tie switches.

Process 400 proceeds to operation 409 wherein the substation controller determines a transformer providing power to the reconnected healthy portion is experiencing an overload condition such that the current flowing through the transformer exceeds a current rating or current threshold of the transformer.

Process 400 proceeds to operation 411 where the substation controller determines sets points for one or more DC interconnection systems effective to eliminate the overload by reducing the current through the overloaded transformer to a current magnitude less than the current rating of the transformer. The set points may be determined based on the current ratings of the available transformers and DC interconnection systems. Finally, process 400 proceeds to operation 413 where the substation controller sends the determined set points to the one or more DC interconnection systems, which are then operated using the set points.

Figure 5:
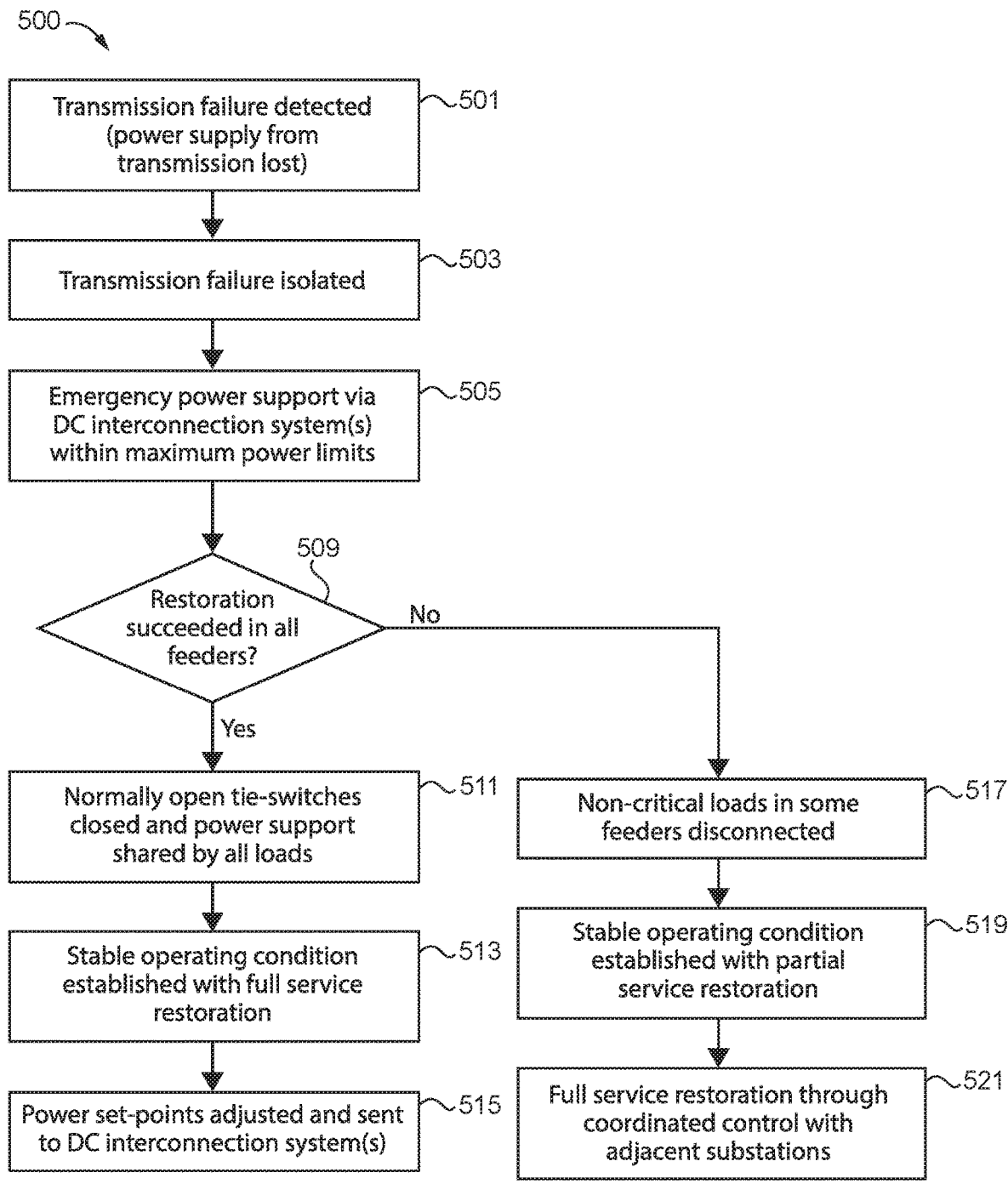

With reference to FIG. 5, there is illustrated an exemplary process 500 for responding to a transformer fault in an MVAC distribution network which includes substations, distribution network portions, and one or more DC interconnection systems. Process 500 is implemented by a network control system which may include a centralized controller, one or more substation controllers, and one or more converter controllers. It shall be further appreciated that a number of variations and modifications to process 500 are contemplated including, for example, the omission of one or more aspects of process 500, the addition of further conditionals and operations, the execution of an operation or conditional by a controller other than the controller identified below, and/or the reorganization or separation of operations and conditionals into separate processes.

Process 500 begins at operation 501 where a substation controller of a first substation detects a transmission fault in a transmission network coupled to the first substation. The transmission fault may be a total power interruption resulting from a short-circuit fault in the supply line from the transmission network to the substation or a fault on the high voltage bus bar of the substation, to name but a few examples.

Process 500 proceeds to operation 503 where the substation controller operates one or more protective devices of the first substation to isolate the transmission fault from a healthy distribution network supplied by the substation, also known as the healthy portion. The protective device may isolate the transmission fault by isolating the medium voltage bus bar of the substation from the transmission network. In certain embodiments, the substation controller may operate a plurality of protective devices effective to operate a plurality of healthy distribution network portions from the transmission fault.

Process 500 proceeds to operation 505 where a converter controller operates a DC interconnection system so as to transfer MVAC power to the healthy portion in response to the isolation and before the healthy portion is deenergized, effective to provide emergency active and/or reactive power support. For example, where the power supply from the transmission network is lost, causing a voltage drop in the distribution network, the control system may provide maximum reactive power to the healthy portion while also providing a rapidly increasing active power. For example, active power may be increased over a time period between 60-100 ms, to name but one possible range. Maximum reactive power may be determined by the current rating of the DC interconnection system, to name but one example. In certain embodiments where the DC interconnection system cannot transfer sufficient power to meet the demand of the loads of the healthy portion, the control system may close a tie switch coupled to the healthy portion in addition to, or in place of, operating the DC interconnection system. In certain embodiments, operation 505 is performed by the DC interconnection system controller using measurements generated by local sensors, such as DC link voltage sensors, current sensors measuring current received and output by the DC interconnection system, and voltage sensors measuring the bus bars to which the DC interconnection system is coupled, to name but a few examples. In certain embodiments, a plurality of DC interconnection systems are operated to transfer power during operation 505.

Process 500 proceeds to conditional 509 where the substation controller determines whether the healthy portion was successfully restored. In certain embodiments, the substation controller receives voltage and frequency measurements of the healthy portion and determines the measurements are within acceptable operating ranges.

If all healthy portions of the distribution network were successfully restored, process 500 proceeds to operation 511 where normally open tie switches are closed effective to couple other portions of the distribution network to the reconnected healthy portion of the distribution network. The newly coupled portions effectively share power support to the reconnected healthy portion.

Process 500 proceeds to operation 513 where the substation controller determines whether the distribution network remains stable following operation 511. The substation controller may determine the distribution network is stable by comparing measurements of bus bar voltages and frequency to acceptable operating ranges.

Process 500 proceeds to operation 515 where the substation controller or a centralized controller determine set points for at least one DC interconnection system. Set points may include active and reactive power set points, which are determined effective to reduce power loss and balance power flow though the DC interconnection system and the transformers providing power to the healthy portion. The determined set points are sent to the converter controller such that the DC interconnection system is operated using the set points.

If the substation controller determines the healthy portion was not successfully restored, process 500 proceeds from conditional 509 to operation 517 where the substation controller sheds non-critical loads coupled to feeder lines of the healthy portion. A load may be designated as non-critical by user input or a load priority table, to name but a few examples. For example, the controller may determine which loads are non-critical in light of the under-frequency level and the load priority in the load priority table.

Process 500 proceeds to operation 519 where the substation controller determines the healthy portion is stable while providing power to the portion of loads coupled to the healthy portion which were not shed during operation 517.

Process 500 proceeds to operation 521 where substation controllers of neighboring substations or a centralized controller determine set points for at least two DC interconnection systems, and also close appropriate tie switches between feeder lines or substations, in order to provide power to the healthy portion sufficient to fully restore all loads coupled to the healthy portion. The determined set points are sent to the converter controller such that the DC interconnection system is operated using the set points.

Further written description of a number of exemplary embodiments shall now be provided. One embodiment is an alternating current (AC) distribution system comprising: a first substation including a first transformer and a protective device, the first transformer being coupled to a transmission network; a first distribution network portion coupled to the first transformer; a second substation including a second transformer; a second distribution network portion coupled to the second transformer structured to receive medium voltage alternating current (MVAC) from the second transformer; a DC interconnection system coupled between the first distribution network portion and the second distribution network portion; and a control system structured to detect a fault in the first transformer or the transmission network, isolate the first distribution network from the fault using the protective device, determine a set point of the DC interconnection system after isolating the first distribution network, and operate the DC interconnection system using the set point so as to transfer a portion of the MVAC from the second distribution network portion to the first distribution network portion.

In certain forms of the foregoing the AC distribution system, the system comprises a second DC interconnection system, wherein the first DC interconnection system is coupled to the second DC interconnection system by way of a DC distribution network. In certain forms, the control system comprises a substation controller of the first substation and a converter controller of the DC interconnection system, and wherein the converter controller is structured to determine the set point of the DC interconnection system after the substation controller isolates the first distribution network using the protective device. In certain forms, the converter controller operates the DC interconnection system effective to prevent a total power interruption of the first distribution network portion. In certain forms, the control system is structured to determine a second set point after the converter controller determines the first set point, and transmit the second set point to the converter controller, wherein the converter controller is structured to operate the DC interconnection system using the second set point instead of the first set point. In certain forms, the control system is structured to close a tie switch in response to isolating the fault, determine the second transformer is overloaded, and determine the set point in response to determining the second transformer is overloaded. In certain forms, the control system determines operating the DC interconnection system using the set point did not successfully restore the first distribution network portion, shed a plurality of non-critical loads in response, transfer MVAC from a third distribution network portion, and reconnect the plurality of shed non-critical loads.

Another exemplary embodiment is a method for fault response in an alternating current (AC) distribution system comprising: detecting, with a control system, a fault in a first transformer of a first substation or a transmission network coupled to the first substation; isolating, with the control system, a first distribution network portion from the fault using a protective device of the first substation; determining, with the control system, a set point of a DC interconnection system coupled between the first distribution network portion and a second distribution network portion after isolating the first distribution network; receiving, with the DC interconnection system, medium voltage alternating current (MVAC) by way of a second transformer of a second substation and the second distribution network; and operating, with the control system, the DC interconnection system using the set point so as to transfer the MVAC from the second distribution network portion to the first distribution network portion.

In certain forms of the foregoing method, the method comprises operating a second DC interconnection system so as to transfer power from the second DC interconnection system to the first interconnection system by way of a DC distribution network. In certain forms, the control system comprises a substation controller of the first substation and a converter controller of the DC interconnection system, and wherein the converter controller is structured to determine the set point of the DC interconnection system after the substation controller isolates the first distribution network using the protective device. In certain forms, the converter controller is structured to operate the DC interconnection system in order to avoid a total power interruption of the first distribution network portion. In certain forms, the method comprises determining, with the substation controller, a second set point after determining the first set point and transmit the second set point to the converter controller, and wherein the converter controller is structured to operate the DC interconnection system using the second set point instead of the first set point. In certain forms, the method comprises closing a tie switch in response to isolating the fault, determining a second transformer is overloaded after closing the tie switch, and determining the set point in response to determining the second transformer is overloaded. In certain forms, the method comprises determining that operating the DC interconnection system using the set point did not successfully restore the first distribution network portion, shedding a plurality of non-critical loads in response to the determining, transferring MVAC from a third distribution network portion, and reconnecting the plurality of shed non-critical loads.

A further exemplary embodiment is a control system for fault response in a medium voltage alternating current (MVAC) network comprising: a substation controller of a first substation; and a converter controller of a DC interconnection system coupled between a first distribution network portion and a second distribution network portion and in communication with the substation controller, wherein the substation controller is structured to detect a fault in a first transformer of a first substation or a transmission network coupled to the first substation and isolate a first distribution network from the fault using a protective device of the first substation, and wherein the converter controller is structured to operate a DC interconnection system using a set point after isolating the first distribution network and transfer medium voltage alternating current (MVAC) from the second distribution network portion to the first distribution network portion.

In certain forms of the foregoing control system, the control system comprises a second DC interconnection system, wherein the first DC interconnection system is coupled to the second DC interconnection system by way of a DC distribution network. In certain forms, the converter controller operates the DC interconnection system effective to prevent a total power interruption of the first distribution network portion. In certain forms, the control system is structured to determine a second set point after determining the first set point and transmit the second set point to the converter controller, wherein the converter controller is structured to operate the DC interconnection system using the second set point instead of the first set point. In certain forms, the control system is structured to close a tie switch in response to isolating the fault, determine a second transformer is overloaded, and determine the set point in response to determining the second transformer is overloaded. In certain forms, the control system determines operating the DC interconnection system using the set point did not successfully restore the first distribution network portion, shed a plurality of non-critical loads in response, transfer MVAC from a third distribution network portion, and reconnect the plurality of shed non-critical loads.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. An alternating current (AC) distribution system comprising:
   a first substation including a first transformer and a protective device, the first transformer being coupled to a transmission network;
   a first distribution network portion coupled to the first transformer;
   a second substation including a second transformer;
   a second distribution network portion coupled to the second transformer structured to receive medium voltage alternating current (MVAC) from the second transformer;
   a DC interconnection system coupled between the first distribution network portion and the second distribution network portion; and
   a control system structured to detect a fault in the first transformer or the transmission network, isolate the first distribution network portion from the fault using the protective device, determine a set point of the DC interconnection system after isolating the first distribution network portion, and operate the DC interconnection system using the set point so as to transfer a portion of the MVAC from the second distribution network portion to the first distribution network portion.

2. The AC distribution system of claim 1, further comprising a second DC interconnection system, wherein the DC interconnection system is coupled to the second DC interconnection system by way of a DC distribution network.

3. The AC distribution system of claim 1, wherein the control system comprises a substation controller of the first substation and a converter controller of the DC interconnection system, and wherein the converter controller is structured to determine the set point of the DC interconnection system after the substation controller isolates the first distribution network portion using the protective device.

4. The AC distribution system of claim 3, wherein the converter controller is structured to operate the DC interconnection system to attempt to prevent a total power interruption of the first distribution network portion.

5. The AC distribution system of claim 4, wherein the control system is structured to determine a second set point after the converter controller determines the set point, and transmit the second set point to the converter controller, wherein the converter controller is structured to operate the DC interconnection system using the second set point instead of the set point.

6. The AC distribution system of claim 1, wherein the control system is structured to close a tie switch in response to isolating the fault, determine the second transformer is overloaded, and determine the set point in response to determining the second transformer is overloaded.

7. The AC distribution system of claim 1, wherein the control system is structured to determine that operating the DC interconnection system using the set point did not successfully restore the first distribution network portion, shed a plurality of non-critical loads in response, transfer MVAC from a third distribution network portion, and reconnect the plurality of shed non-critical loads.

8. A method for fault response in an alternating current (AC) distribution system, the method comprising:
 detecting a fault in a first transformer of a first substation or a transmission network coupled to the first substation;
 isolating a first distribution network portion from the fault using a protective device of the first substation;
 determining a set point of a DC interconnection system coupled between the first distribution network portion and a second distribution network portion after isolating the first distribution network portion;
 receiving medium voltage alternating current (MVAC) at the DC interconnection system by way of a second transformer of a second substation and the second distribution network portion; and
 operating the DC interconnection system using the set point so as to transfer the MVAC from the second distribution network portion to the first distribution network portion.

9. The method of claim 8, comprising operating a second DC interconnection system so as to transfer power from the second DC interconnection system to the DC interconnection system by way of a DC distribution network.

10. The method of claim 8, comprising determining the set point of the DC interconnection system after isolating the first distribution network portion using the protective device.

11. The method of claim 10, comprising operating the DC interconnection system in order to avoid a total power interruption of the first distribution network portion.

12. The method of claim 11, comprising determining a second set point after determining the set point and operating the DC interconnection system using the second set point instead of the set point.

13. The method of claim 8, comprising closing a tie switch in response to isolating the fault, determining the second transformer is overloaded after closing the tie switch, and determining the set point in response to determining the second transformer is overloaded.

14. The method of claim 8, comprising determining that operating the DC interconnection system using the set point did not successfully restore the first distribution network portion, shedding a plurality of non-critical loads in response to the determining, transferring the MVAC from a third distribution network portion, and reconnecting the plurality of shed non-critical loads.

15. A control system comprising:
 a substation controller of a first substation; and
 a converter controller of a DC interconnection system coupled between a first distribution network portion and a second distribution network portion and in communication with the substation controller,
 wherein the substation controller is structured to detect a fault in a first transformer of the first substation or a transmission network coupled to the first substation and to isolate a first distribution network from the fault using a protective device of the first substation, and
 wherein the converter controller is structured to operate the DC interconnection system using a set point after isolating the first distribution network and to transfer medium voltage alternating current (MVAC) from the second distribution network portion to the first distribution network portion.

16. The control system of claim 15, comprising a second DC interconnection system, wherein the DC interconnection system is coupled to the second DC interconnection system by way of a DC distribution network.

17. The control system of claim 15, wherein the converter controller is structured to operate the DC interconnection system to attempt to prevent a total power interruption of the first distribution network portion.

18. The control system of claim 17, wherein the control system is structured to determine a second set point after determining the set point and transmit the second set point to the converter controller, and wherein the converter controller is structured to operate the DC interconnection system using the second set point instead of the set point.

19. The control system of claim 15, wherein the control system is structured to close a tie switch in response to isolating the fault, determine a second transformer is overloaded, and determine the set point in response to determining the second transformer is overloaded.

20. The control system of claim 15, wherein the control system is structured to determine that operating the DC interconnection system using the set point did not successfully restore the first distribution network portion, shed a plurality of non-critical loads in response, transfer MVAC from a third distribution network portion, and reconnect the plurality of shed non-critical loads.

21. The method of claim 8, wherein the steps of detecting the fault, isolating the first distribution network portion, determining the set point of the DC interconnection system, and operating the DC interconnection system are performed with a control system that comprises a substation controller of the first substation and a converter controller of the DC interconnection system.

22. The method of claim 21, comprising using the converter controller to determine the set point of the DC interconnection system after the substation controller isolates the first distribution network portion using the protective device.

23. The method of claim 22, comprising using the converter controller to operate the DC interconnection system to avoid a total power interruption of the first distribution network portion.

24. The method of claim 23, comprising using the substation controller to determine a second set point after determining the set point, using the substation controller to transmit the second set point to the converter controller, and using the converter controller to operate the DC interconnection system using the second set point instead of the set point.

* * * * *